United States Patent
Dakroub (10) Patent No.: US 6,466,386 B1
(45) Date of Patent: Oct. 15, 2002

(54) MAGNETIC RECORDING USING DISCRETE PULSED WRITE CURRENTS IN A DISC DRIVE

(75) Inventor: Housan Dakroub, Oklahoma City, OK (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/470,659

(22) Filed: Dec. 22, 1999

Related U.S. Application Data (60) Provisional application No. 60/121,031, filed on Feb. 22, 1999.

(51) Int. Cl.$^7$ ............................................. G11B 5/09
(52) U.S. Cl. ......................................... 360/46; 360/68
(58) Field of Search .............................. 360/41, 45, 48, 360/46, 50, 119, 51, 68

(56) References Cited

U.S. PATENT DOCUMENTS

| | | | |
|---|---|---|---|
| 4,562,491 A | | 12/1985 | Kawabata et al. |
| 4,625,245 A | * | 11/1986 | White ......................... 360/40 |
| 4,639,794 A | | 1/1987 | Ferrier |
| 4,799,112 A | * | 1/1989 | Bremmer et al. ............. 360/31 |
| 4,965,873 A | | 10/1990 | White |
| 5,067,032 A | | 11/1991 | Ida |
| 5,107,378 A | | 4/1992 | Cronch et al. |
| 5,159,501 A | | 10/1992 | Genheimer |
| 5,291,069 A | | 3/1994 | Gooding et al. |
| 5,638,012 A | | 6/1997 | Hashimoto et al. |
| 5,687,036 A | | 11/1997 | Kassab |
| 5,774,285 A | | 6/1998 | Kassab et al. |
| 5,801,910 A | | 9/1998 | Mallary |

* cited by examiner

Primary Examiner—David Hudspeth
Assistant Examiner—Varsha A. Kapadia
(74) Attorney, Agent, or Firm—Fellers, Snider, et al.

(57) ABSTRACT

Apparatus and method for writing data to a magnetic recording medium in the form of magnetization vectors having alternating magnetic orientations and lengths ranging from a minimum symbol length to a maximum symbol length. A write element adjacent the medium includes a leading edge and a trailing edge to form a write gap which generates a write gap recording field having a length substantially greater than the minimum symbol length. A write driver applies a write current signal to the write element as a series of current pulses, each pulse magnetizing an area of the disc corresponding to the length of the write gap recording field. A subsequent current pulse is applied while a portion of a first area magnetized by a previous pulse remains disposed between the leading edge and the trailing edge of the write element, so that the remaining portion of the first area beyond the trailing edge of the write element forms a magnetization vector of selected symbol length.

14 Claims, 7 Drawing Sheets

MAGNETIC RECORDING USING DISCRETE PULSED WRITE CURRENTS IN A DISC DRIVE

RELATED APPLICATIONS

This application claims priority to United States Provisional Application No. 60/121,031 filed Feb. 22, 1999.

FIELD OF THE INVENTION

This invention relates generally to the field of magnetic data storage devices, and more particularly, but not by way of limitation, to improving data transfer rate performance by writing data to a magnetic medium using discrete pulsed write currents.

BACKGROUND

Disc drives are used as primary data storage devices in modern computer systems and networks. A typical disc drive comprises one or more rigid magnetic storage discs which are journaled about a spindle motor for rotation at a constant high speed. An array of read/write transducing heads are provided to transfer data between tracks of the discs and a host computer in which the disc drive is mounted. The heads are mounted to a rotary actuator assembly and are controllably positioned adjacent the tracks by a closed loop servo system.

Each of the disc surfaces is provided with a magnetizable media coating to retain the data as a series of magnetic domains of selected orientation which are impressed by a write element of the corresponding head and subsequently detected by a read element of the head. Although a variety of head constructions have been utilized historically, magneto-resistive (MR) heads are typically used in disc drives of the present generation. An MR head uses a thin-film inductive coil arranged about a ferromagnetic core with a write gap so that, as write currents are passed through the coil, magnetic flux lines fringing across the write gap extend into the adjacent media to establish magnetization vectors, or intervals, in directions along the track. Magnetic flux transitions are established at boundaries between adjacent intervals of opposite orientation, and these flux transitions (each indicative of a logical one) are detected by an MR read element which has a characteristic electrical resistance that changes in the presence of a magnetic field. Thus, by passing a small biasing current through the MR read element, the flux transitions can be transduced in relation to the voltage across the MR read element.

To write a computer file to disc, a disc drive receives the file from the host computer in the form of input data which are buffered by an interface circuit. A write channel encodes and serializes the data to generate a data stream that can be represented as a square-wave type signal with varying interval (symbol) lengths between successively occurring rising and falling edges. The placement of the rising and falling edges correspond to the logical ones in the data sequence.

A preamplifier/driver circuit (preamp) uses the data stream to generate write currents which are applied to the head to write the encoded data to the selected disc surface. Typically, disc drives use a continuous write current that toggles from a maximum current value of a first polarity (such as +50 milliamps, mA) to a corresponding maximum current value of a second, opposite polarity (such as −50 mA), with the periodic changes in current direction inducing the aforementioned flux transitions on the media. Such methodology is discussed, for example, in U.S. Pat. No. 5,159,501 issued Oct. 27, 1992 to Genheimer.

While constant current recording has been found useful, it becomes increasingly difficult to write the data using a continuous current at higher transfer rates such as greater than one gigabit (Gb) per second ($1 \times 10^9$ bits/sec), due to various factors including stray inductance and capacitance along the conductive paths between the heads and the preamp, the slew rate in the positive and negative transitions, and the power dissipated by the preamp.

As an alternative to a continuous write current, impulse magnetic recording has been proposed in the prior art as discussed by U.S. Pat. No. 4,562,491 issued Dec. 31, 1985 to Kawabata et al. and U.S. Pat. No. 4,965,873 issued Oct. 23, 1990 to White. Kawabata et al. proposes writing data to a magnetic medium by converting each continuous current pulse into a series of very short duration, discrete pulses for each interval. By time shifting the pulses supplied to a number of different heads, data can be written to multiple heads at the same time using a single power supply with a current output capacity sufficient for only one head. White also proposes writing data using a series of positive and negative transition pulses of very short duration. White uses higher amplitude transition pulses to write flux transitions and uses additional, lower amplitude sustaining pulses of the same polarity to sustain the recorded magnetic field for longer intervals between successive transition pulses. It will be noted that both Kawabata et al. and White are directed to relatively lower data transfer rates and use multiple current pulses to write the magnetization vectors.

While operable, there remains a continued need for improvements in the art to enhance magnetic write performance at ever increasing data transfer rates. It is to this end that the present invention is directed.

SUMMARY OF THE INVENTION

The present invention provides an apparatus and method for improving disc drive data transfer rate performance.

In accordance with preferred embodiments, a disc drive comprises a rotatable disc to which data are stored as a sequence of magnetization vectors having alternating magnetic orientation and associated lengths that range from a minimum symbol length (such as 1T) to a maximum symbol length (such as 6T).

A write element is provided having a leading edge and a trailing edge to form a write gap therebetween, the write gap generating a write gap recording field having a length substantially greater than the minimum symbol length. A first current pulse is applied to the write element to magnetically orient a first area of the magnetic medium in a first direction. A second current pulse is subsequently applied to the write element to magnetically orient a second area of the magnetic medium in a second direction opposite the first direction. The first and second current pulses have opposing polarities and respective short durations with respect to a period of time required for a point on the magnetic medium to traverse the write gap.

The second current pulse is applied while a portion of the first area remains between the leading edge and the trailing edge of the write element so that the portion of the first area is magnetically reoriented by the second current pulse. The remaining portion of the first area disposed beyond the trailing edge of the write element comprises a magnetization vector of desired symbol length.

In one preferred embodiment, the length of the write gap recording field exceeds the maximum symbol length. In such case, the application of each current pulse is sufficient to magnetize the medium for all symbol lengths. In another preferred embodiment, the length of the write gap recording field remains substantially greater than the minimum symbol length, but is less than the maximum symbol length. In such case, an additional extension pulse is applied having the same polarity as the immediately preceding pulse to form a magnetization vector having a symbol length greater than the length of the write gap recording field.

These and various other features and advantages which characterize the present invention will be apparent from a reading of the following detailed description and a review of the associated drawings.

BRIEF DESCRIPTION OF THE DRAWINGS

FIG. 9 is a graphical representation of a discrete pulse write current signal configured to write the magnetization of FIG. 4 in accordance with a second preferred embodiment of the present invention wherein the write gap recording field is shorter than the maximum symbol length of FIG. 4.

FIG. 10 illustrates the manner in which the magnetization of FIG. 4 is carried out using the discrete pulse write current signal of FIG. 9.

DETAILED DESCRIPTION

Figure 1:
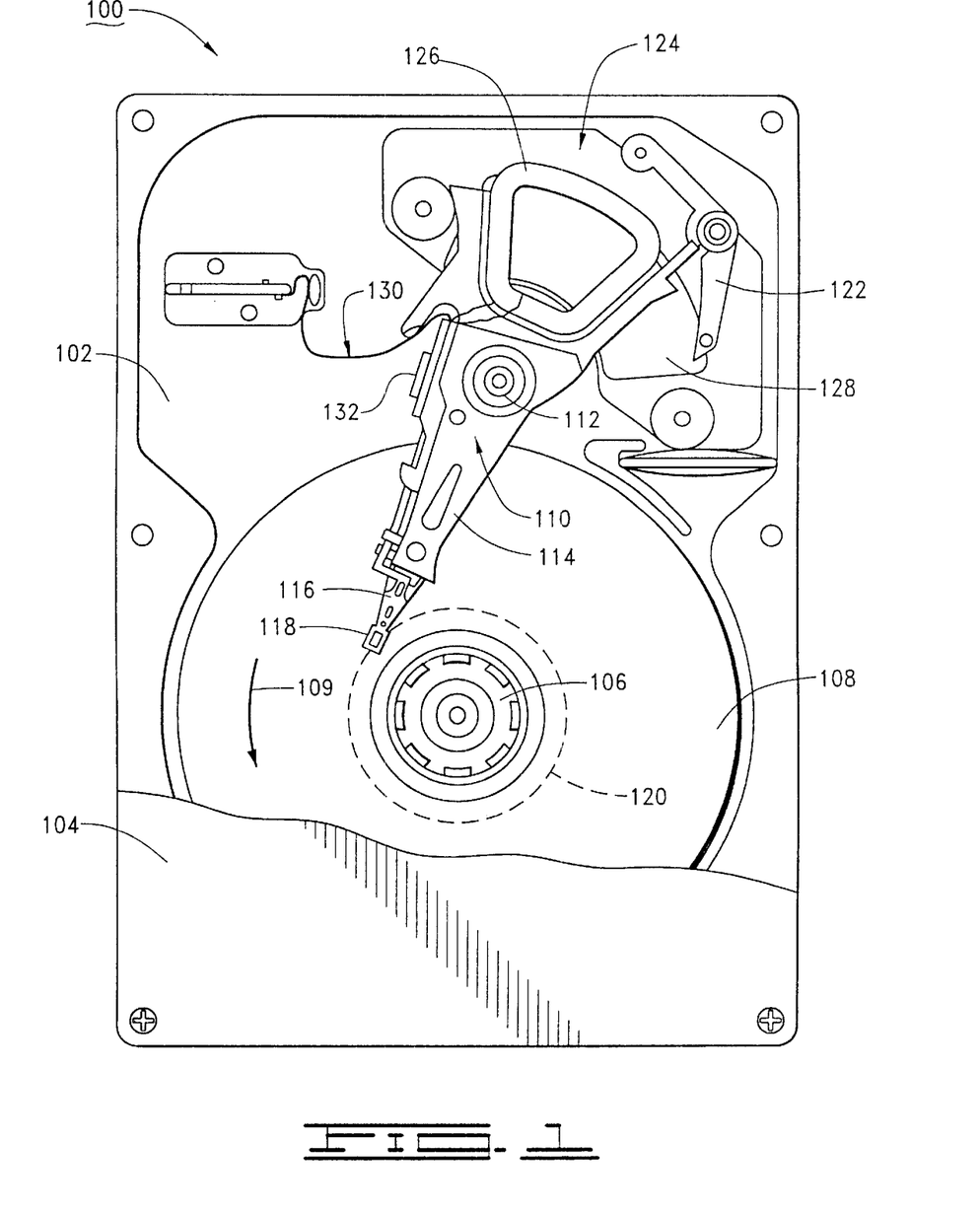
FIG. 1 is a top plan view of a disc drive constructed in accordance with preferred embodiments of the present invention.

Referring to FIG. 1, shown therein is a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor 106 rotates a plurality of magnetic recording discs 108 at a constant high speed (in thousands of revolutions per minute) in an angular direction denoted by arrow 109. User data are written to and read from tracks (not designated) on the discs 108 through the use of an actuator assembly 110, which rotates about a bearing shaft assembly 112 adjacent the discs 108. The actuator assembly 110 includes a plurality of rigid actuator arms 114 which support flexible suspension assemblies 116 (flexures). A head 118 is supported at the end of each flexure 116, with the heads preferably having a magneto-resistive (MR) construction.

When the disc drive 100 is not in use, the heads 118 are parked on landing zones 120 and the actuator assembly 110 is secured using a magnetic latch assembly 122. A voice coil motor (VCM) 124 controls the position of the heads 118 through application of current to a coil 126 which interacts with a magnetic circuit which includes a permanent magnet 128. A flex assembly 130 facilitates electrical communication between the actuator assembly 110 and a disc drive printed circuit board (PCB) mounted to the underside of the base deck 102. The flex assembly 130 includes a preamplifier/ driver circuit 132 (preamp) which electrically interfaces with the heads.

Figure 2:
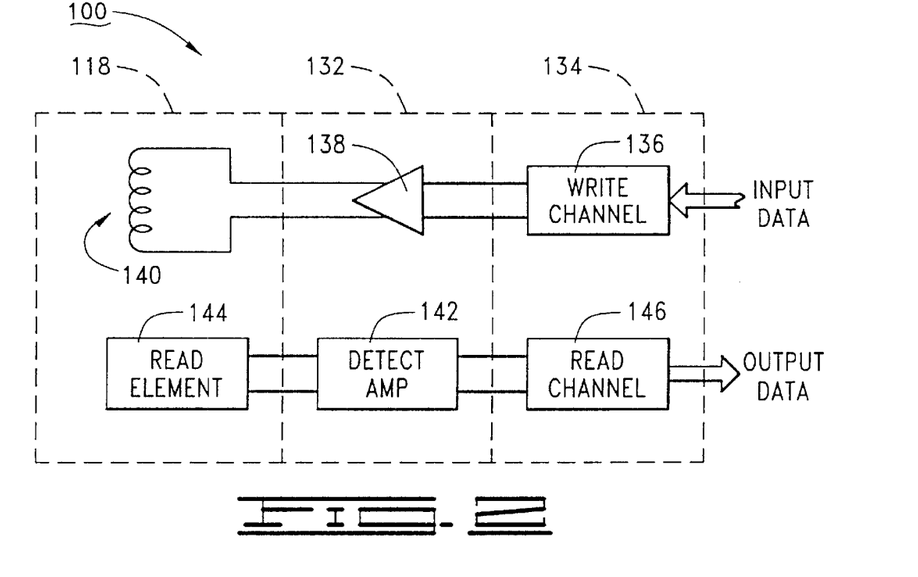
FIG. 2 is a functional block diagram showing the manner in which data are transferred between the discs of the disc drive of FIG. 1 and a host computer.

FIG. 2 generally illustrates the manner in which data are transferred between the discs 108 and a host computer. A data communication channel 134 (mounted to the aforementioned disc drive PCB) includes a write channel 136 which encodes and serializes input data to form a data stream which is applied to a write driver 138 of the preamp 132. As discussed in greater detail below, the write driver 138 applies write currents to a thin-film inductive write element 140 of the selected head 108 to write the encoded data to the associated disc 108.

To readback previously stored data, a detection amplifier 142 of the preamp 132 applies a read bias current to a magneto-resistive (MR) read element 144 and transduces the selective magnetization of the disc 108 to form a readback signal in relation to changes in voltage across the read element 144. The detection amplifier 142 further amplifies and conditions the readback signal and supplies the same to a read channel 146 of the data channel 134 to reconstruct the output data.

Figure 3:
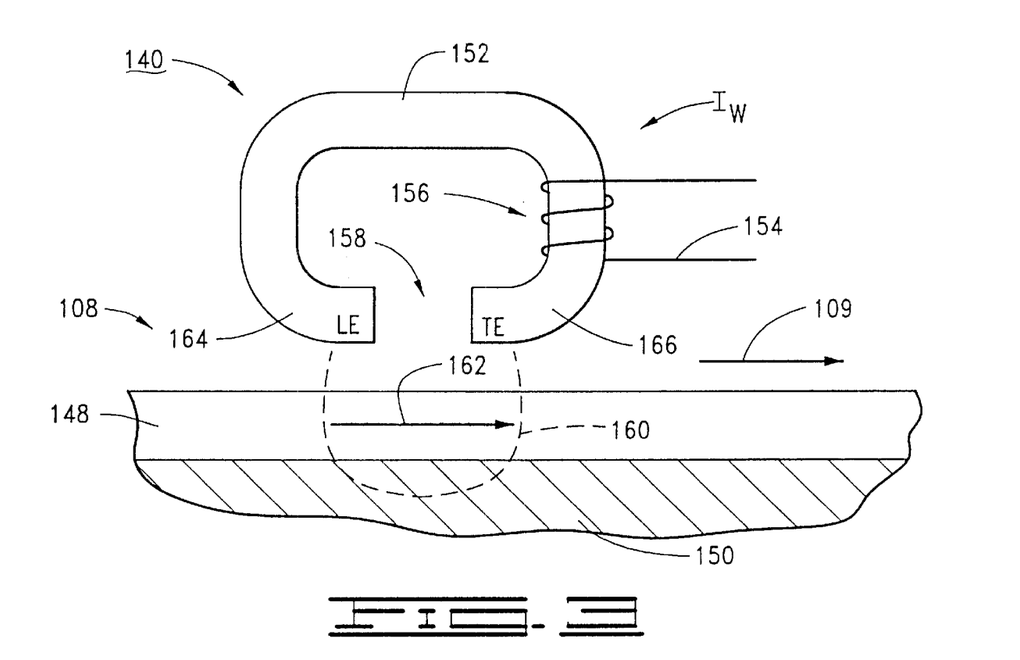
FIG. 3 is a schematic diagram of the write element shown in FIG. 2 in conjunction with a portion of a magnetic media layer on the corresponding disc of the disc drive of FIG. 1, with FIG. 2 illustrating -a write gap recording field formed from a write gap of the write element.

FIG. 3 provides a schematic view of the write element 140 of FIG. 2 in conjunction with the associated disc 108. It will be understood that the geometries shown in FIG. 3 and the successively presented figures are representational in nature and do not necessarily reflect the actual relative sizes and placements of the components shown therein. As conventional, the disc 108 includes a magnetizable media layer 148 that is applied to a substrate 150 during disc fabrication. The layer 148 magnetically stores the data as a series of magnetization vectors, or intervals of defined symbol length, with orientations generally aligned in directions along the tracks.

The write element 140 includes a generally horseshoe-shaped ferromagnetic core 152 about which a conductor 154 is wound to form a coil 156. When write currents $I_w$ are passed along the conductor 154, magnetic flux lines are established in the core 152 and traverse a write gap 158, generating a write gap recording field (WGRF) 160 of sufficient strength to magnetically orient the enveloped portion of the layer 148, as shown.

Write currents in a first direction serve to magnetically orient the layer 148 along the track in the direction represented by magnetization vector 162, which is the same as the direction of rotation 109 of the layer 148; write currents in a second, opposite direction orient the layer 148 in the opposite direction along the track. The core 152 includes a leading edge (LE) 164 and a trailing edge (TE) 166 with the write gap 158 formed in the space therebetween. The WGRF 160, also referred to as a magnetic bubble, has a length along the track that is determined by, and slightly exceeds, the distance between the LE 164 and the TE 166 (i.e., the "width" of the write gap 158). It will be readily understood that the magnetic field generated by the write gap does not abruptly stop beyond the bubble 160, but rather, the bubble generally represents the extent to which the magnetization of the layer 148 has sufficient field strength to be subsequently recovered by the read element 144. Reversals in magnetization (flux transitions) are nominally generated at locations defined at the trailing edge of the WGRF 160.

Figure 4:
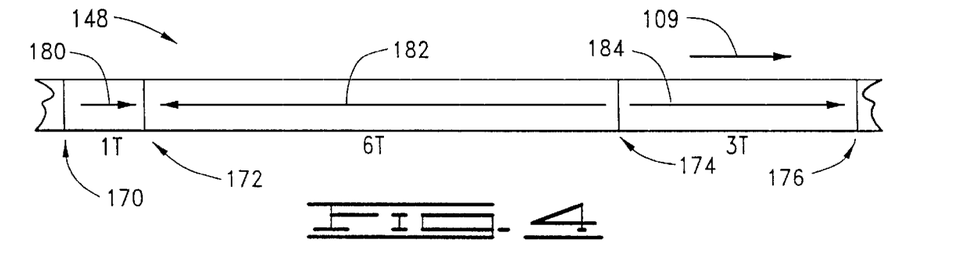
FIG. 4 is a representation of the media layer of FIG. 3 having a series of magnetization vectors of selected symbol length, with adjacent pairs of vectors having magnetizations of opposing orientations to form magnetic flux transitions therebetween.

FIG. 4 shows a representation of a portion of the layer 148 that has been recorded by the write element 140 of FIG. 3. A total of four magnetic flux transitions 170, 172, 174 and 176 are represented by vertical boundaries between three successive magnetization vectors 180, 182 and 184. The vectors have symbol lengths of 1T, 6T and 3T respectively, where T represents a time interval related to a write clock that establishes the relative timing of the flux transitions 170, 172, 174 and 176. It will be understood that in the present example, the encoding scheme used by the disc drive 100 allows symbol lengths that range from a minimum symbol length of 1T to a maximum symbol length of 6T, although other schemes can readily be employed.

Figure 5:
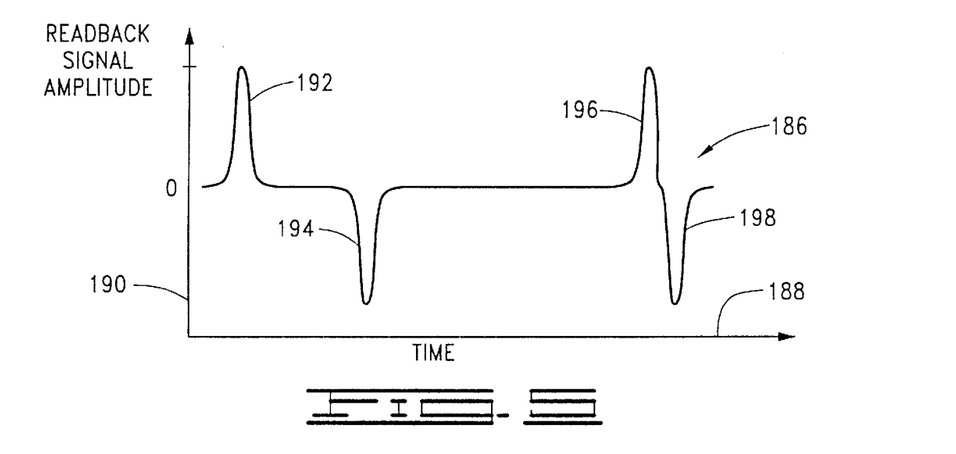
FIG. 5 is a graphical representation of a readback signal generated as the read element of FIG. 2 transduces the media layer of FIG. 4.

For reference, FIG. 5 illustrates a readback signal 186 obtained from the media layer 148 as recorded in FIG. 4. The readback signal 186, plotted against an x-axis 188 indicative of elapsed time and a y-axis 190 indicative of readback signal amplitude, has a baseline amplitude of substantially zero volts when the read element 144 is disposed over the respective vectors 180, 182 and 184. Positive and negative peaks 192, 194, 196 and 198 are generated as the read element 144 passes over and detects the sequentially occurring flux transitions 176, 174, 172 and 170, respectively. It will be noted that the flux transition 176 is the first transition to arrive at the read element 144, based on the direction of rotation 109.

Figure 6:
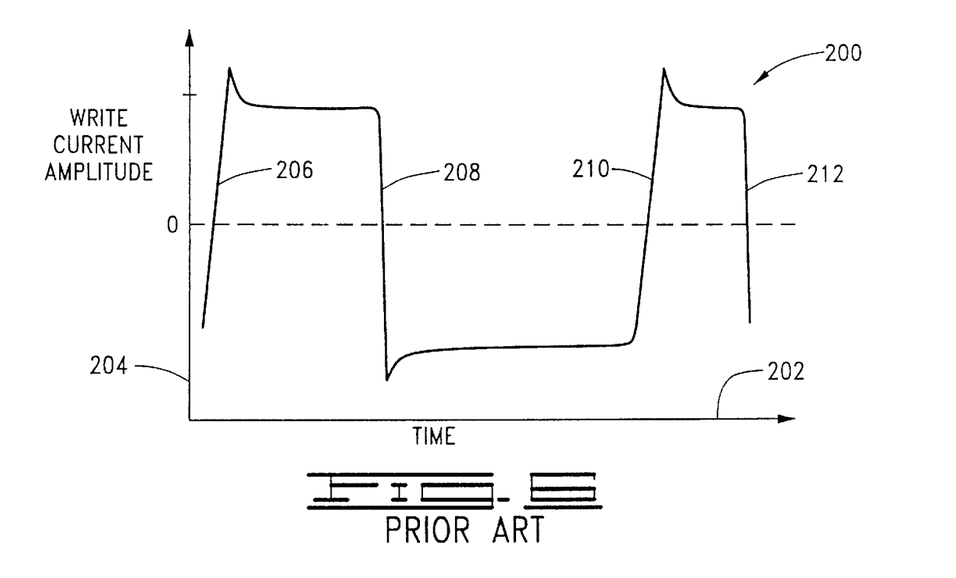
FIG. 6 is a graphical representation of a prior art continuous write current signal configured to write the magnetization of FIG. 4.

FIG. 6 presents a continuous write current signal 200 illustrative of the manner in which the magnetization of FIG. 4 is typically written in accordance with the prior art. The write current signal 200, plotted against an x-axis 202 and a y-axis 204, is a continuous signal that toggles between a maximum current value in a first direction (such as +50 milliamps, mA) to a corresponding maximum current value in a second, opposite direction (such as −50 mA). The respective positive and negative going current transitions 206, 208, 210 and 212 induce the aforedescribed flux transitions 176, 174, 172 and 170 as the media 148 passes under the write element 140.

While advantageously writing the data stream to the media 148, the prior art methodology of FIG. 6 requires fast transitions in output current over a substantial range of opposing maximum current values. With continued increases in data transfer rates (i.e., the frequency at which the time interval T occurs), it becomes increasingly difficult to consistently and accurately carry out these changes in current direction. The power dissipated by the write driver at such high transfer rates is substantial, which limits the maximum current magnitudes that can be applied and can, over time, reduce the operation and reliability of the drive. Moreover, as transfer rates increase, factors such as stray inductance and capacitance have increasingly greater detrimental effects on the resulting shapes of the currents that reach the write element, resulting in degraded write performance from overshoot, ringing and signal decay.

Figure 7:
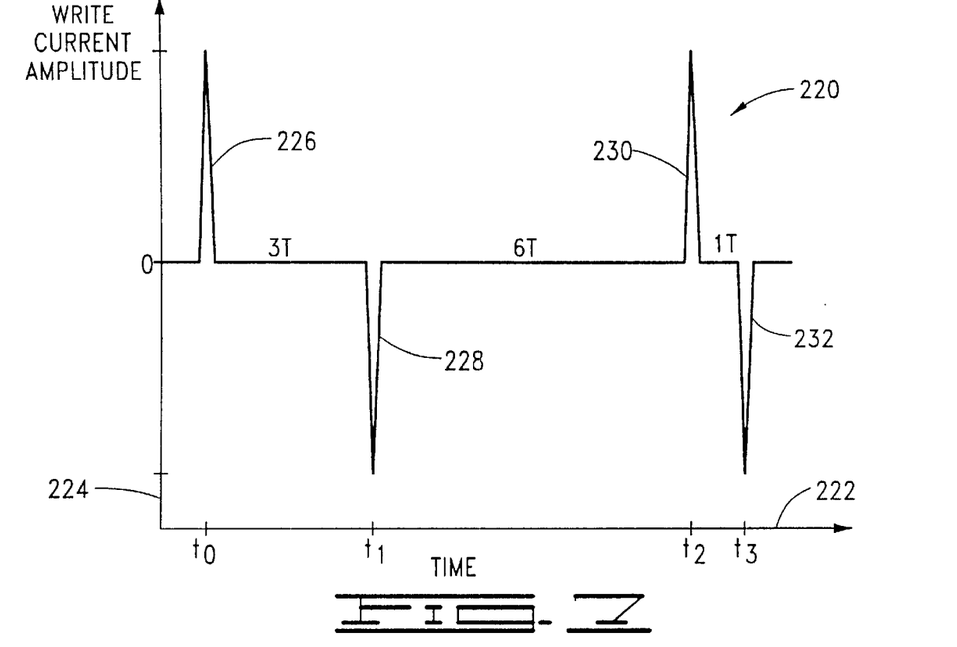
FIG. 7 is a graphical representation of a discrete pulse write current signal configured to write the magnetization of FIG. 4 in accordance with a first preferred embodiment of the present invention wherein the write gap recording field of FIG. 2 is longer than the maximum symbol length of FIG. 4.

Accordingly, FIG. 7 has been provided to illustrate a discrete pulse write current signal 220 generated in accordance with a preferred embodiment of the present invention. The write current signal 220 produces the magnetization of FIG. 4 and is plotted against an x-axis 222 indicative of elapsed time and a y-axis 224 indicative of amplitude.

For the example of FIG. 7, it is contemplated that the relative geometries of the disc drive 100 are such that the length of the WGRF 160 is greater than the maximum symbol length; in other words, the vector 162 in FIG. 3 is longer than the 6T vector 182 in FIG. 4. Of course, the general relationship between WGRF 160 and symbol length depends upon factors including the construction of the head 118 and the frequency T at which the data are written to the disc (i.e., the recording bit-density along the tracks).

In the example of FIG. 7, a single current pulse is sufficient to magnetize the entire length of every length magnetization vector on the disc 108, so that there is no need to maintain the current at the positive and negative levels shown in the prior art FIG. 6. Current pulses 226, 228, 230 and 232 in the write current signal 220 of FIG. 7 can thus generate the respective flux transitions 176, 174, 172 and 170 in FIG. 4 in a "stamp" and "trim" manner, more fully discussed in FIG. 8. At this point it will be noted that it is well within the ability of those skilled in the art to configure a write driver such as shown at 138 in FIG. 2 to output the current pulses shown in FIG. 7; for a more detailed discussion of current pulse generation techniques, see the aforementioned prior art U.S. Pat. No. 4,562,491 Kawabata et al. and U.S. Pat. No. 4,965,873 White references.

Figure 8:
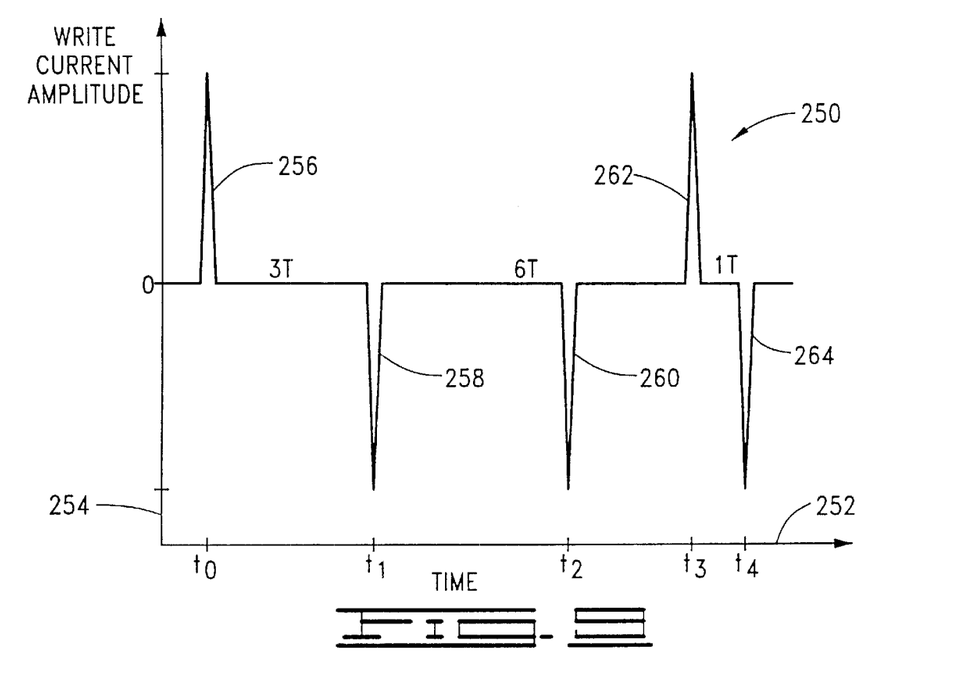
FIG. 8 illustrates the manner in which the magnetization of FIG. 4 is carried out using the discrete pulse write current signal of FIG. 7.

FIG. 8 shows a time sequence of the media layer 148 as the data of FIG. 4 are written. The media layer 148 will in most cases have an initial magnetization, but such preexisting magnetization is not germane and has therefore been omitted for purposes of clarity.

First, at time $t_0$, the current pulse 226 of FIG. 7 is applied to the write element 140. This serves to magnetize an area 234 of the media layer 148 in a first magnetic direction, as indicated by the cross-hatching angled to the left in FIG. 8. The first magnetic flux transition 176 is formed at a boundary of the area 234. It will be understood that each of the current pulses 226, 228, 230 and 232 are of very short duration with respect to the time required for a point on the media layer 148 to pass from the LE 164 to the TE 166 of the write gap core 152 (FIG. 2).

At time $t_1$, the second current pulse 228 of FIG. 7 is applied to the write element 140. As the polarity of the current pulse 228 is opposite that of the current pulse 226, the current pulse 228 magnetizes an area 236 in the second direction opposite the magnetization of area 234, as indicated by the cross-hatching angled to the right in FIG. 8. An edge of the area 236 locates the magnetic flux transition 174.

It can be seen that the area 236 overlaps the area 234 by an increment 238, since the second pulse 228 is applied before all of the area 234 previously magnetized at time $t_o$ passes the write gap 158. Thus, the subsequently applied pulse 228 "trims" the area previously magnetized by the pulse 226 to produce the desired symbol length (3T in this case).

Continuing with FIG. 8, the next current pulse 230 of FIG. 7 is applied at time $t_2$. This produces a magnetized area 240 in FIG. 8 with an orientation in the first direction (as with the previous current pulse 226 at time $t_0$). A boundary of the area 240 defines the magnetic flux transition 172. As before, the area 240 overlaps the previously magnetized area 236 by an increment 242 so that the area 236 is trimmed to produce the 6T interval as shown.

Finally, the current pulse 232 is applied at time $t_3$ to magnetize an area 244 with the same magnetic orientation as at time $t_1$. The area 244 defines the magnetic flux transition 170 and overlaps the previously magnetized area 240 by an increment 246, resulting in the 1T interval as shown.

It will be noted that the length of the media layer 148 that is trimmed upon the occurrence of each successive current pulse is equal to the difference in length between the WGRF 160 and the resulting symbol length. Thus, every area that is magnetized in response to a current pulse (such as the areas 234, 236, 240 and 244) has at least a portion thereof that undergoes two successive magnetizations in opposite directions (such as indicated by the increments 238, 242 and 246).

It follows that, depending upon the relative geometries between the WGRF 160 and the minimum symbol length, a portion of an area magnetized by a current pulse might undergo any number of magnetization changes as it passes between the leading and trailing edges of the WGRF 160 in relation to the ratio between WGRF and symbol length. For example, if a series of 1T symbols are written in succession, and the WGRF is about 6T in length, the portion of the media layer 148 immediately adjacent the leading edge of the WGRF established by the first current pulse will be alternately magnetized a total of six times before emerging as a 1T symbol.

FIG. 9 presents another preferred embodiment of the present invention, showing a discrete write current signal 250, plotted against an x-axis 252 indicative of elapsed time and a y-axis 254 indicative of current amplitude. The write current signal 250 is similar to the write current signal 220 of FIG. 7, except that in this example the WGRF has a length that is greater than the minimum symbol length (1T), but less than the maximum symbol length (6T). Particularly, it is contemplated in this case that the WGRF 160 has a length substantially equal to a symbol length of 4T.

The write current signal 250 of FIG. 9 accordingly includes write current pulses 256, 258, 260, 262 and 264, with the pulse 256 corresponding to flux transition 176 (FIG. 4), the pulse 258 corresponding to flux transition 174, the pulse 262 corresponding to flux transition 172 and the pulse 264 corresponding to flux transition 170. The pulse 260 is of the same polarity as immediately preceding pulse 258 and serves to extend the corresponding 6T symbol length, as will now be discussed with reference to FIG. 10.

FIG. 10 shows a time series of the media layer 148 during the writing of the arrangement of FIG. 4 using the write current signal 250 of FIG. 9. At time 8, the current pulse 256 establishes the magnetization of an area 266 on the media layer 148 in a first direction. As before, an edge of the area 266 defines the flux transition 176.

At time $t_1$, the current pulse 258 magnetizes an area 268 in a second direction. The trailing edge of the area 268 defines the flux transition 174. The area 268 further overlaps the previously magnetized area 266 by an increment 270.

At time $t_2$, the current pulse 260 is applied to magnetize an area 272 with the same magnetization as the area 268. In this example, the current pulse 260 is applied just as an edge 274 of the area 268 (at time $t_1$) passes the trailing edge 166 of the write element 140 (at time $t_2$). Of course, in alternative embodiments the current pulse 260 can occur in a shorter interval of time after the current pulse 258 to cause the adjacent, same orientation magnetization areas 268, 272 to overlap slightly, as desired. The current pulse 260 thus operates as an extension pulse to extend the area of magnetization of the magnetic layer to a length longer than the length of the WGRF 160.

Continuing with FIG. 10, at time $t_3$ the current pulse 262 is applied to reverse the magnetization of the media layer 148 at area 276, which overlaps the area 272 by an increment 278 and defines the location of the flux transition 172. The location of the edge 274 is shown at time $t_3$, for reference. Finally, the current pulse 264 is applied at time $t_4$ to magnetize area 280, defining the flux transition 170 and overlapping the area 276 by an increment 282.

It will be noted that disc drives typically record data on a zone basis, so that different zones or groups of tracks across the disc surfaces have data written at different frequencies, with higher write frequencies at tracks disposed near outer radii of the discs and lower write frequencies at tracks disposed near inner radii of the discs. It is contemplated that, as areal recording densities increase, even at the lowest data recording frequency the WGRF 160 will exceed the maximum symbol length so that the methodology as set forth by the write current signal 220 in FIGS. 7 and 8 may be used irrespective of the radius of the disc 108.

The opposite case, of course, is that even the highest data recording frequency still results in a WGRF 160 that is greater than the minimum symbol length, but less than the maximum symbol length. In this case, the methodology of FIGS. 9 and 10 could be utilized for all data tracks.

A third possibility is that the maximum data recording frequency (at outer disc radii, for example) results in symbol lengths that are less than the WGRF 160, but the minimum data recording frequency (at inner disc radii, for example) provides symbol lengths that are greater than the WGRF 160. In this case, the disc drive could write test patterns by zone of tracks and determine whether the methodology of FIGS. 7 and 8 (no extension pulses) or the methodology of FIGS. 9 and 10 (with extension pulses for longer symbol lengths) should be applied, on a zone-by-zone basis. Such evaluation methodology could entail any number of forms, such as writing a series of successively longer symbol lengths and reading the data a number of times to determine if acceptable readback performance is obtained for each successively longer symbol length.

Figure 11:
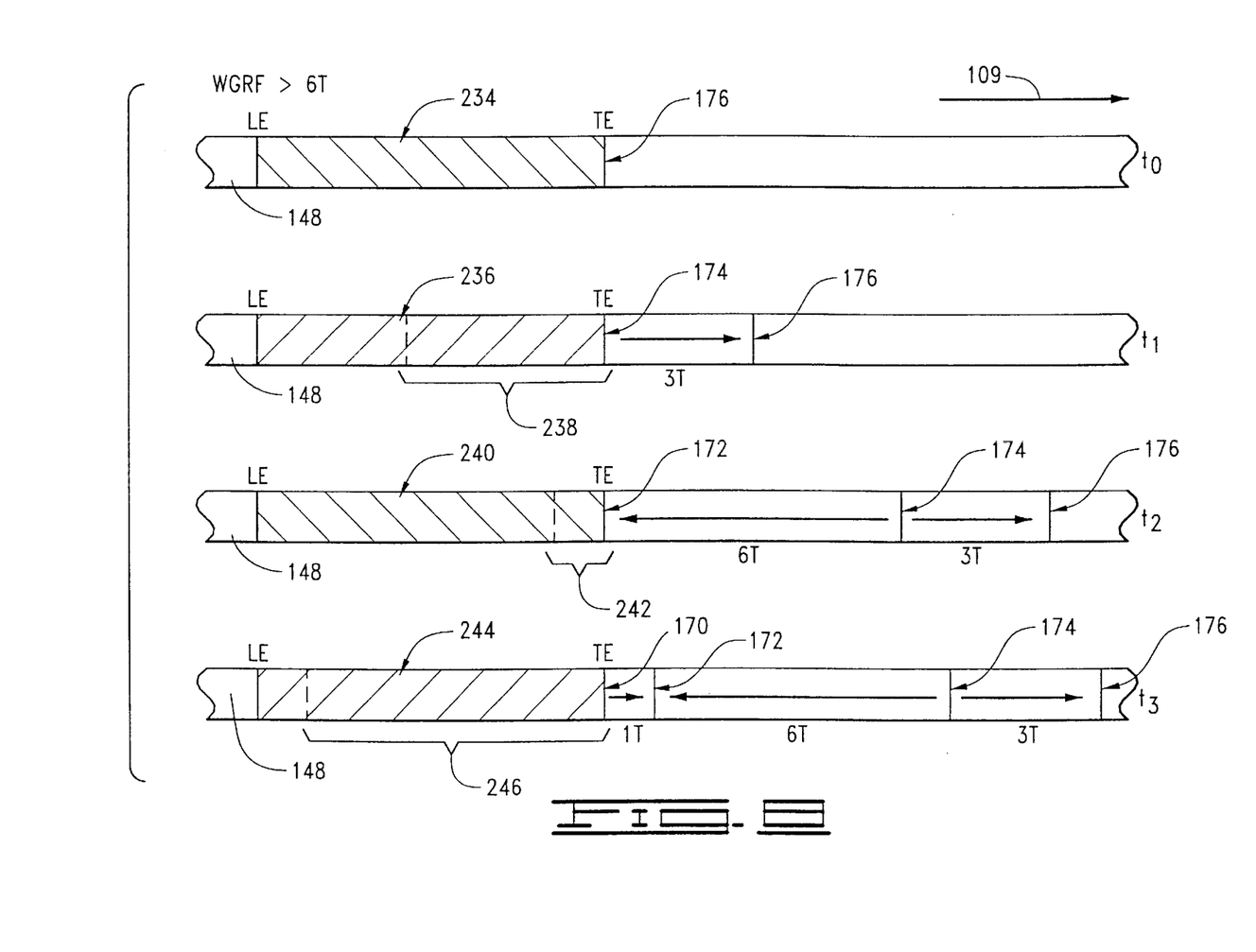
FIG. 11 provides a flow chart for a MAGNETIC RECORDING routine, setting forth steps carried out in accordance with preferred embodiments of the present invention.

FIG. 11 has been presented to show a flow chart for a MAGNETIC RECORDING routine 300, representative of steps carried out in accordance with the various previously described embodiments of the present invention.

At step 302, the disc drive 100 is first configured with a write gap recording field (such as the WGRF 160 in FIG. 2) that is substantially greater than the minimum symbol length (minT) in the series of symbol lengths defining the magnetic recording scheme. As will be recalled, the embodiments presented herein have used a minimum symbol length of 1T and a maximum symbol length (maxT) of 6T. At step 304, the input data is encoded and serialized into a data stream comprising a sequence of symbol lengths extending from the minimum symbol length to the maximum symbol length.

Next, at decision step 306, the routine determines whether the write gap recording field (WGRF) has a length that is greater than the length of the maximum symbol length (maxT). If not, provision is made for additional, extension pulses (such as the extension pulse 260 of FIG. 9) for symbol lengths that are longer than the write gap recording field at step 308. Alternatively, if the write gap recording field is greater than the maximum symbol length, the routine skips step 308. Finally, current pulses are applied to the write element 140 at step 310 to magnetize the media layer 148 in relation to the data stream so that magnetization vectors of desired symbol length are induced in the layer. The routine then ends at step 312.

The present invention, as embodied hereinabove and claimed below, provides several advantages over the prior art. First, the use of current pulses significantly reduces the power requirements for the write driver 138 as compared to continuous write current methodologies such as discussed in FIG. 6. Better edge definition and control can also be obtained, as well as faster switching since the write driver only needs to switch between 0 amps and the positive and negative maximum current amplitudes, instead of switching between maximum current amplitude extremes.

Although preferred embodiments disclosed herein have contemplated the use of a rotatable disc, it will be apparent that the claimed invention can be readily used with other types of magnetic media, such as magnetic tape.

In summary, it will be recognized that the present invention is directed to an apparatus and method for writing data to a magnetic medium. In accordance with preferred embodiments, the magnetic medium comprises a disc 108 of a disc drive 100. The data are stored as a sequence of magnetization vectors 162, 180, 182, 184 having alternating magnetic orientation and associated lengths that range from a minimum symbol length (such as 1T) to a maximum symbol length (such as 6T).

A write element 140 is provided having a leading edge 164 and a trailing edge 166 to form a write gap 158 which generates a write gap recording field 160 having a length substantially greater than the minimum symbol length. A first current pulse 226, 256 is applied to the write element 140 to magnetically orient a first area 234, 266 of the magnetic medium in a first direction. A second current pulse 228, 258 is subsequently applied to the write element 140 to magnetically orient a second area 268 of the magnetic medium in a second direction opposite the first direction. The first and second current pulses have opposing polarities and respective short durations with respect to a period of time required for a point on the magnetic medium to traverse the write gap 158.

The second current pulse is applied while a portion 238, 270 of the first area remains between the leading edge 164 and the trailing edge 166 of the write element 140 so that the portion of the first area is magnetically reoriented by the second current pulse. The remaining portion of the first area disposed beyond the trailing edge of the write element comprises a magnetization vector 184 of desired symbol length.

In one preferred embodiment, the length of the write gap recording field exceeds the maximum symbol length. In such case, the application of each current pulse is sufficient to magnetize the medium for all symbol lengths. In another preferred embodiment, the length of the write gap recording field remains substantially greater than the minimum symbol length, but is less than the maximum symbol length. In such case, an additional extension pulse is applied having the same polarity as the immediately preceding pulse to form a magnetization vector having a symbol length greater than the length of the write gap recording field.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for magnetically recording input data to a magnetic medium as a sequence of magnetization vectors having alternating magnetic orientation and associated lengths that range from a minimum symbol length to a maximum symbol length, the method comprising steps of:

providing a write element having a leading edge and a trailing edge to form a write gap which generates a write gap recording field having a length substantially greater than the minimum symbol length;

applying a first current pulse to the write element to magnetically orient a first area of the magnetic medium in a first direction; and subsequently applying a second current pulse to the write element to magnetically orient a second area of the magnetic medium in a second direction opposite the first direction, the first and second current pulses of opposite polarity and each having a substantially short duration with respect to a period of time required for a point on the magnetic medium to traverse the write gap, wherein the second current pulse is applied while a portion of the first area remains between the leading edge and the trailing edge of the write element so that the portion of the first area is magnetically reoriented by the second current pulse, a remaining portion of the first area beyond the trailing edge of the write element comprising a selected magnetization vector of desired symbol length, wherein the elapsed period of time between the first and second pulses is variably adjusted in relation to the desired symbol length of the selected magnetization vector.

2. The method of claim 1, wherein the length of the write gap recording field of the providing step (a) exceeds the maximum symbol length.

3. The method of claim 1, wherein the length of the write gap recording field of the providing step (a) is less than the maximum symbol length, and wherein the method further comprises a step of:

(d) subsequently applying a third current pulse to the write element to magnetically orient a third area of the magnetic medium in the second direction so that the second and third areas form a second magnetization vector with the maximum symbol length.

4. The method of claim 1, wherein the magnetic medium comprises a rotatable disc of a disc drive.

5. The method of claim 4, further comprising steps of:

(d) dividing the disc radially into a plurality of zones each comprising a plurality of tracks to which the data are written at a common write frequency, wherein at least one zone has a highest write frequency and at least one zone has a lowest write frequency;

(e) evaluating each zone to determine whether the associated write frequency is sufficiently high to cause the length of the write gap recording field to exceed the maximum symbol length for magnetization vectors written to the zone; and (f) for each zone wherein the length of the write gap recording field does not exceed the maximum symbol length for magnetization vectors written to the zone, subsequently applying a third current pulse to the write element to magnetically orient a third area of the magnetic medium in the second direction so that the second and third areas form a second magnetization vector with a symbol length that exceeds the length of the write gap recording field.

6. A disc drive, comprising:

a rotatable disc to which data are magnetically stored as a sequence of magnetization vectors having alternating magnetic orientation and associated lengths that range from a minimum symbol length to a maximum symbol length;

a write element, adjacent the disc, having a leading edge and a trailing edge to form a write gap which generates a write gap recording field having a length substantially greater than the minimum symbol length; and a write driver, connected to the write element, which writes input data to the disc as a series of current pulses of short duration with respect to a period of time required for a point on the disc to traverse the write gap, wherein each current pulse magnetizes an area of the disc corresponding to the length of the write gap recording field, each area having a magnetic orientation determined by a polarity of the associated current pulse, and wherein a subsequent current pulse is applied while a portion of an area magnetized by a previous pulse remains disposed between the leading edge and the trailing edge of the write element so that the portion is magnetically reoriented by the subsequent current pulse, a remaining portion of the area magnetized by the previous pulse disposed beyond the trailing edge of the write element comprising a selected magnetization vector of selected symbol length, wherein different elapsed periods of time between the first and second pulses are used to provide different symbol lengths for the selected magnetization vector.

7. The disc drive of claim 6, wherein the length of the write gap recording field exceeds the maximum symbol length.

8. The disc drive of claim 6, wherein the length of the write gap recording field is less than the maximum symbol length, and wherein write driver. subsequently applies an extension current pulse to the write element having the same polarity as the subsequently pulse to magnetically orient an area of the disc adjacent an area magnetically oriented by the subsequent pulse to form a second magnetization vector with the maximum symbol length.

9. The disc drive of claim 6, wherein the disc is radially divided into a plurality of zones each comprising a plurality of tracks to which data are written at a common write frequency so that at least one zone has a highest write frequency and at least one zone has a lowest write frequency, and wherein, for each zone that has an associated write frequency insufficient to cause the length of the write gap recording field to exceed the maximum symbol length for magnetization vectors written to the zone, the write driver subsequently applies an extension current pulse to the write element having the same polarity as the subsequent pulse to magnetically orient an area of the disc adjacent an area magnetically oriented by the subsequent pulse to form a second magnetization vector with the maximum symbol length.

10. A data storage device, comprising:

a recording medium to which data are magnetically stored as a sequence of magnetization vectors having alternating magnetic orientation and associated lengths that range from a minimum symbol length to a maximum symbol length;

a write element, adjacent the recording medium, having a leading edge and a trailing edge to form a write gap which generates a write gap recording field having a length that exceeds the maximum symbol length; and means for writing data to the recording medium by applying write signals to the write element as a series of current pulses of short duration with respect to a period of time required for a point on the disc to traverse the write gap, wherein different elapsed times between successive current pulses are used to write magnetization vectors having correspondingly different symbol lengths.

11. The data storage device of claim 10, wherein the means for writing data comprises a write driver coupled to the write element.

12. A method for recording data using a data transducing head having a write gap and a magnetic recording medium having a recording surface, the head providing a write gap recording field which selectively magnetizes the recording surface along a length substantially equal to a length of the write gap, the data recorded as a sequence of magnetization vectors having alternating magnetic orientation and associated symbol lengths that range from a minimum symbol length to a maximum symbol length, the method comprising applying a sequence of electrical pulses of short time duration to the head, wherein the time duration of each pulse is a small fraction of a traverse time defined as an elapsed time for a point on the recording surface to traverse the length of the write gap, and wherein an elapsed time period between each pair of successive pulses varies for different symbol lengths and is selected independently of the traverse time.

13. The method of claim 12, wherein the length of the write gap recording field exceeds the maximum symbol length.

14. The method of claim 12, wherein the recording medium comprises a rotatable magnetic recording disc.

* * * * *